Feb. 12, 1952 C. W. HEWLETT, JR 2,585,654
SATURABLE CORE DIRECT CURRENT TO ALTERNATING CURRENT CONVERTER
Filed Dec. 3, 1948
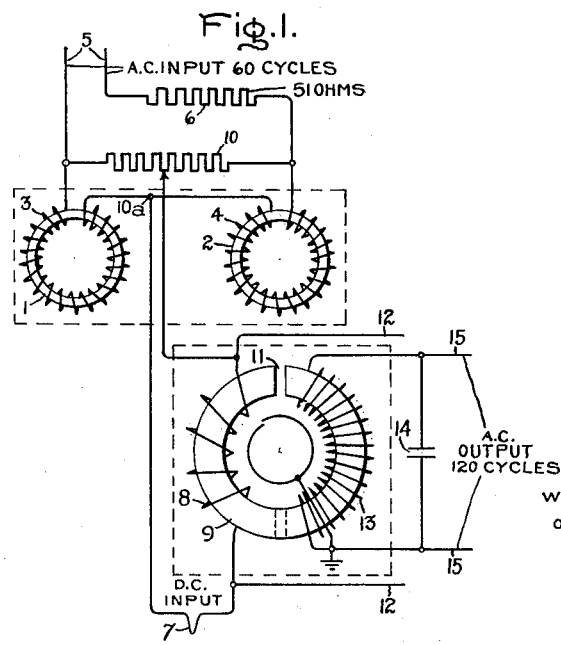
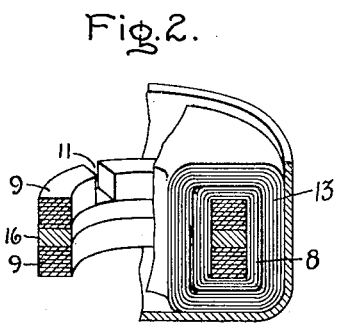
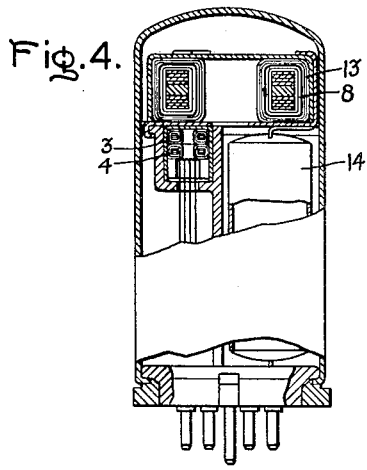
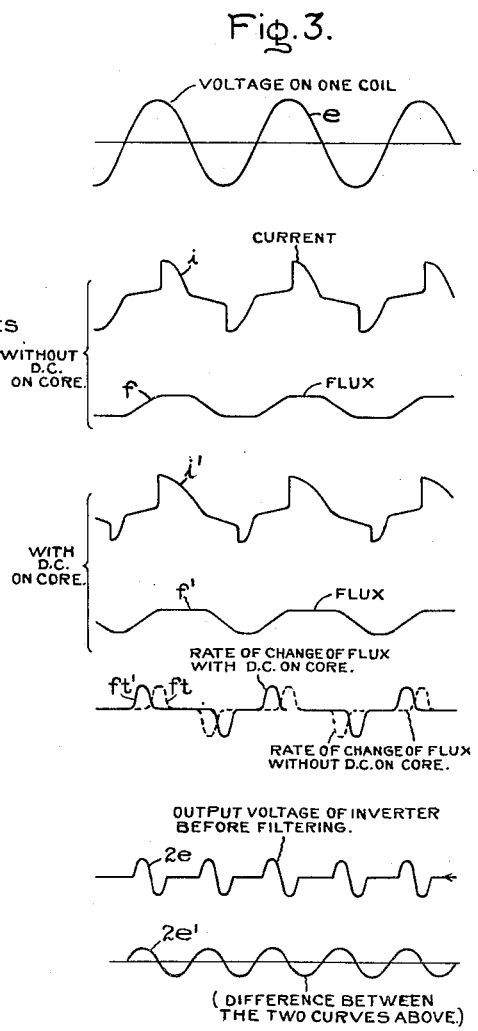
Inventor:
Clarence W. Hewlett, Jr.,
by
His Attorney.

Patented Feb. 12, 1952

2,585,654

UNITED STATES PATENT OFFICE 2,585,654

SATURABLE CORE DIRECT CURRENT TO ALTERNATING CURRENT CONVERTER

Clarence W. Hewlett, Jr., New York, N. Y., assignor to General Electric Company, a corporation of New York Application December 3, 1948, Serial No. 63,288

1 Claim. (Cl. 332—51)

My invention relates to apparatus for converting small direct voltages or currents into alternating current of a character that can be efficiently amplified for measurement and control purposes.

It is an object of my invention to provide a converter of high sensitivity capable of responding to very small D.-C. voltages or currents and to convert the same to a proportional A.-C. current with a minimum interference from stray fields and unwanted noise signals.

A further object of my invention is to provide such a converter which is low in cost and small in size and has a small time constant.

My entire converter apparatus may be housed in a shielding metal housing of radio tube size and has a time constant of less than one second. In carrying my invention into effect, I employ a pair of saturable core devices supplied with alternating current into which the direct current to be converted is fed through a reactor. The saturable core devices so modify the direct current flow as to cause a second harmonic voltage proportional to the D.-C. input to appear across the reactor. This reactor preferably serves as a step-up transformer for the second harmonic output voltage.

The features of my invention which are believed to be novel and patentable will be pointed out in the claim appended hereto. For a better understanding of my invention reference is made in the following description to the accompanying drawing in which Fig. 1 represents a circuit diagram of my converter; Fig. 2 shows a cross section of the core structure 9 of Fig. 1; Fig. 3 shows voltage and flux curves explanatory of my invention; and Fig. 4 represents a tubular shielding housing with plug terminals in which my converter apparatus may be contained.

Referring now to Fig. 1, 1 and 2 represent similar circular cores of high permeability low saturation density material. While I do not wish to limit my invention to the specific specifications which will be mentioned herein, I will give specifications found to be practicable for carrying out my invention for 60-cycle and for 400-cycle excitation. The cores 1 and 2 may have an inside diameter of 0.2 in., an outside diameter of 0.24 in., and each contain one lamination of 0.010 in. thickness made of mu metal, and hence, are thin washer-shaped cores less than one-half the size of a dime. Mu metal is a high permeability alloy of 76 per cent nickel, 4 per cent copper, and 1½ per cent chromium, manufactured by the Allegheny Ludlum Steel Corp., which when properly treated has a permeability of 70,000 GCS units and an intrinsic induction saturation of 7800 gauss. The A.-C. toroidal windings 3 and 4 completely cover the cores and thus minimize stray field pickup. These coils may each consist of 1000 turns of 0.0025 in. insulated wire and, as shown, are energized in series from the 60-cycle A.-C. power supply 5. Sufficient resistance at 6 is included in this excitation circuit to reduce the voltage across the two coils 1 and 2 to about 0.2 volt. This A.-C. excitation should be sufficient to completely saturate the cores 1 and 2 and will be about 4 milliamperes.

The D.-C. voltage to be converted may be that of a thermocouple 7 and is fed in parallel to the windings 1 and 2 through a choke comprising a winding 8 on a core 9. One connection from the D.-C. input to the coils 3 and 4 is to the midpoint of a two-ohm resistance 10 connected across coils 3 and 4. The tap of this connection is adjustable to balance the converter operation between the two cores 1 and 2. For 400-cycle excitation I preferably also use a one-ohm adjustable resistance similarly connected at the other connection at 10a. The coil 8 may have 100 turns for 60-cycle excitation at 5 and 400 turns for 400-cycle excitation at 5, and is toroidally wound over the complete circular core 9. Core 9 may have an inside diameter of ½ in. and an outside diameter of ⅞ in. and comprise forty C-shaped laminations of mu metal of 0.003 in. thickness.

To obtain a high ratio of reactance to resistance in this device the laminations have slots 11 therein. One half of the laminations on one side of the core have these slots in alignment, and the other half of the laminations on the opposite side of the core have their slots in alignment but 180 degrees from the slots in the first-mentioned half. These two groups of laminations are then spaced apart by a nonmagnetic spacer 16 as shown in Fig. 2, so that the laminations of one group will not short-circuit the gap in the laminations of the other group. The reason for staggering the slots in the laminations 180 degrees apart is to render this core immune to magnetic pickup.

The action of the converter is such that an A.-C. voltage of double the frequency of supply 5 appears across choke coil 8 which voltage is proportional to the D.-C. input from 7, and the A.-C. output voltage from the converter may be taken off from terminals 12 across coil 8. It is generally desirable to step up this A.-C. output voltage with a transformer, and the core 9 and the coil 8 of the choke may be used as the core and primary of such step-up transformer. Accordingly, a secondary coil 13 is provided having a number of turns necessary to provide satisfactory set-up transformer action. Thus for a 60-cycle input the coil 13 may have about 4000 turns and for 400-cycle input about 3000 turns. These turns will likewise be wound toroidally over the entire core. For 60-cycle input a 0.1 microfarad condenser 14 is connected across the transformer output terminals 15 to provide filtering action. For 400-cycle excitation, using the transformers described, a 0.0147 mfd. filtering condenser would be used at 14. An A.-C. output at terminals 15 of 3 millivolts may be expected from a D.-C. input of ten microamperes. The frequency of the A.-C. output is double that of the A.-C. input from source 5.

The converter action is explained with the aid of the curves of Fig. 3.

In Fig. 3 curve $e$ may represent the voltage from source 5 applied to one of the coils 3. The curve $i$ represents the corresponding current in winding 3. The peculiar wave shape of $i$ is due to the fact that the voltage $e$ is absorbed by the inductance of coil 3 during one part of the cycle and by the resistance of the coil during another part of the cycle. The flux in core 1 may then be represented by curve $f$. Curves $i$ and $f$ are representative when no direct current flows in the circuit from thermocouple 7. At this time the two halves of the inverter circuit are electrically and magnetically symmetrical. Curves $i'$ and $f'$ represent the current and flux curves of coil 3 and core 1 when a direct current flows in the coil from source 7, and the effect is to increase the current and flux during one-half of the cycle and decrease it during the other half of the cycle.

Dotted line curve $ft$ is representative of the rate of change of flux in core 1 when the flux corresponds to curve $f$, and the full line curve $ft'$ is representative of the rate of change of flux in core 1 when the flux corresponds to curve $f'$. The output voltage which is applied across coil 8 corresponds to the difference between curves $ft$ and $ft'$ and may be represented by curve $2e$, and has double the frequency of the A.-C. exciting voltage $e$. Similar action occurs in the other half of the converter comprising coil 4 and core 2 and since the two halves are in parallel so far as the D.-C. circuit is concerned, the curve $2e$ represents the combined output. The voltage $2e$ is stepped up by a transformer having the secondary 13 and the after filtering, becomes approximately a sine wave second harmonic voltage represented by curve $2e'$. This output voltage is proportional to the D.-C. input voltage from thermocouple 7 or other direct current source.

When there is no D.-C. input, the bridge circuit is balanced; that is, the voltage developed across the coils 3 or 4 is equal to the voltage developed across the corresponding half of resistor 10 and their sum is zero, hence, there is no voltage output. When direct current flows, this is no longer true, as the impedance to the D.-C. flow is different in the coil and resistor parts of the circuit due to saturation of the core of the coil. If the polarity of the D.-C. input changes, the second harmonic output voltage will change by 180 degrees relative to the excitation frequency.

In order to obtain satisfactory results for a converter of the type and for the purpose described, certain precautions are necessary. Although it might appear that the size of the cores 1 and 2 and the coils 3 and 4 has little bearing on the success or failure of a converter of the type described, size is nevertheless of the utmost importance for reasons that are not apparent but which will now be explained.

In the first place, the D.-C. resistance of the converter should match as near as feasible the internal resistance of the direct current input source, such as the thermocouple 7, because when the resistance of the converter is equal to the internal resistance of the direct current signal source, maximum direct current power will be fed into the converter. A practicable value of matching resistance for the thermocouple application is from 18 to 25 ohms. In the second place, the time constant of the converter must be small. This means the time interval between the input of a given signal and the output response. It would be desirable to have no time lag but this does not appear possible. However, it is possible to reduce this time lag to appreciably less than one second by making the converter cores 1 and 2 and coils 3 and 4 small. This is explained as follows:

Let us assume that we have a toroidal coil design for the coils 3 and 4 of a given size and of the proper resistance R, which occupies a cross-sectional area A, has a mean length of turn $d$, and a number of turns N. Now assume another coil design in which all of the dimensions are reduced by one-half that of the larger coil, but which also has the desired resistance R to match the resistance of the input source. The smaller coil will occupy a cross-sectional area $$\frac{A}{4}$$

It will have a mean length of turn about $1/2d$, and we will designate its number of turns as X. The cross-sectional size of wire used in the larger coil is $$\frac{A}{N}$$

and that in the smaller coil is $$\frac{A}{4X}$$

The resistance of the coils is proportional to the length of mean turn times the number of turns divided by the cross-sectional size of wire used. Thus for the larger coil:

$$R = \frac{dN}{\frac{A}{N}} = \frac{dN^2}{A}$$

For the smaller coil:

$$R = \frac{\frac{1}{2}dX}{\frac{A}{4X}} = \frac{2dX^2}{A}$$

Then $$\frac{dN^2}{A} = \frac{2dX^2}{A}$$

$$X^2 = \frac{N^2}{2} \text{ or } X = \frac{N}{\sqrt{2}}$$

Now the time constant of the coils can be compared. Let L represent the inductance of the larger coil and L' the inductance of the smaller coil. The time constant is $$\frac{\text{Inductance}}{\text{Resistance}}$$

R being the same in the two coils, a comparison of the inductance will suffice. In the larger coil $$L = \frac{N^2 \mu a}{d}$$

where $\mu$ is the permeability, and $a$ the cross-sectional area of the iron used in the core. In the smaller coil $$L' = \frac{\left(\frac{N}{\sqrt{2}}\right)^2 \mu \left(\frac{a}{4}\right)}{d} = \frac{N^2 \mu a \frac{1}{8}}{d}$$

It is thus seen that by reducing the side of coil used by ½, the time constant is reduced by ¼. Hence, the importance of the use of small coils for the coils and cores for the coils 3 and 4 and cores 1 and 2 is illustrated. For manufacturing reasons the smallness of these parts is limited, and it is not practicable or necessary to go below the size heretofore mentioned for the thermocouple source application where the resistance R is of the order of 20 ohms.

Another important desirable result obtained by scaling down the size of coils and cores in the illustration given is that the magnetizing force for the smaller coil is increased and results in a higher density. Although the number of turns in the smaller coil is reduced by the ratio of $$\frac{1}{\sqrt{2}}$$

the cross-sectional area of the core is reduced by ¼ and the length reduced by about ½, and since the same current flows in either case, the density with the smaller coils and cores is increased, which improves the signal-to-noise ratio.

The entire converter apparatus with all its components are placed in a metal type radio tube as represented in Fig. 4 having a diameter of 1¼ inches and a length of about 3½ inches. This tube being made of iron provides shielding to the entire converter apparatus. All of the coils are individually shielded also as indicated in Figs. 2 and 4.

What I claim as new and desire to secure by Letters Patent of the United States is:

A saturable core alternating-current to direct-current converter comprising a pair of similar ring-shaped cores of high permeability material, terminals connecting said coils in series to an alternating current source, a reactor, connections and terminals connecting said reactor in series and said coils in parallel to a direct current source to be converted, said reactor having a ring-shaped core made up of two C-shaped portions of high permeability magnetic material and a nonmagnetic spacer separating said portions and with the openings in the C-shaped portions disposed 180 degrees apart, a secondary transformer winding on said reactor core, a filter connected to filter the output voltage of said transformer and output terminals therefor, and a metallic container having a diameter of 1¼ inches and a length of about 3½ inches enclosing and shielding all of the above-mentioned converter parts, said container having plug terminal connectors for all of said converter terminals.

CLARENCE W. HEWLETT, Jr.

REFERENCES CITED

The following references are of record in the file of this patent:

UNITED STATES PATENTS

| Number | Name | Date |
|---|---|---|
| 1,653,859 | Kuhn | Dec. 27, 1927 |
| 2,053,154 | Pierre | Sept. 1, 1936 |
| 2,450,286 | Livingston | Sept. 27, 1948 |
| 2,472,980 | Miller et al. | June 14, 1949 |

FOREIGN PATENTS

| Number | Country | Date |
|---|---|---|
| 123,156 | Australia | June 10, 1931 |